US006102283A

United States Patent [19]

Kann

[11] Patent Number: 6,102,283

[45] Date of Patent: Aug. 15, 2000

[54] REFUSE DISCHARGE GUIDE

[76] Inventor: Dirk C. Kann, 531-1/2 River Park Dr., Guttenberg, Iowa 52052

[21] Appl. No.: 08/867,544

[22] Filed: Jun. 2, 1997

[51] Int. Cl.[7] ..................................................... B65G 11/04

[52] U.S. Cl. ........................... 232/44; 232/43.1; 220/826; 220/908; 193/32; 414/414; 294/68.2; 294/68.26

[58] Field of Search .................................... 220/212, 350, 220/810, 817, 818, 825, 826, 908, 909; 193/32, 40; 222/162; 414/414; 294/68.1, 68.2, 68.26; 232/43.1, 43.3, 43.4, 43.5, 44

[56] References Cited

U.S. PATENT DOCUMENTS

| | | | |
|---|---|---|---|
| 3,086,674 | 4/1963 | Scheuerman . | |
| 3,187,872 | 6/1965 | Hill et al. . | |
| 3,504,813 | 4/1970 | Weir . | |
| 3,565,225 | 2/1971 | Fay . | |
| 3,669,485 | 6/1972 | Stihler . | |
| 3,675,810 | 7/1972 | Ross, Jr. et al. . | |
| 3,729,121 | 4/1973 | Cannon . | |
| 3,759,561 | 9/1973 | Barnes et al. . | |
| 3,797,878 | 3/1974 | Fagre et al. . | |
| 3,917,084 | 11/1975 | Swisher, Jr. et al. . | |
| 3,934,691 | 1/1976 | Toloczko . | |
| 4,558,799 | 12/1985 | Hammond . | |
| 4,628,007 | 12/1986 | Ledsham . | |
| 4,676,431 | 6/1987 | Teske et al. | 232/43.1 |
| 4,726,616 | 2/1988 | Schmidt . | |
| 4,782,606 | 11/1988 | Surface . | |
| 5,170,906 | 12/1992 | Kochelek . | |
| 5,323,902 | 6/1994 | Palmer et al. . | |
| 5,490,606 | 2/1996 | Lombardo . | |
| 5,746,324 | 5/1998 | Smedlund | 232/43.1 X |
| 5,868,267 | 2/1999 | Taylor . | |

*Primary Examiner*—Terry Lee Melius
*Assistant Examiner*—William L. Miller
*Attorney, Agent, or Firm*—Foley & Lardner

[57] ABSTRACT

A refuse container includes a plurality of walls defining an interior for containing refuse and a discharge opening and a refuse discharge guide adjacent the discharge opening. The refuse discharge guide moves between a first position in which the guide extends away from the opening into the interior for loading refuse and a second position in which the guide extends away from the opening underneath the interior for funneling refuse during unloading.

37 Claims, 11 Drawing Sheets

REFUSE DISCHARGE GUIDE

FIELD OF THE INVENTION

The present invention relates to refuse containers for receiving and storing refuse until the refuse is unloaded into a larger refuse collection chamber. In particular, the present invention relates to a refuse container including at least one movable refuse discharge guide adjacent the discharge opening which funnels refuse during unloading of refuse from the container.

BACKGROUND OF THE INVENTION

Residential, commercial and industrial refuse is typically stored and contained in a variety of receptacles or containers including cans, carts and dumpsters prior to pick-up by a refuse collection vehicle. A refuse collection vehicle used to collect and transport the refuse typically includes a large storage body in which the refuse is aggregated during collection. To reduce the overall time required for handling refuse contained in smaller receptacles or containers such as cans and carts, many refuse collection vehicles are equipped with intermediate containers or "carry-cans" which, when full, are unloaded into the storage body.

To unload the refuse contained in the container, the container is typically lifted and inverted over or through an access opening of the storage body or the intermediate container. If the refuse is first unloaded into an intermediate container, the intermediate container, once full, is also lifted and inverted over or through an access opening of the storage body to unload the refuse from the intermediate container into the storage body. During inversion of the container and during inversion of the intermediate container, refuse frequently misses the access opening of the intermediate container or the access opening of the storage body and as a result, spills over the sides and top of the truck, littering a street or surrounding area. Wind aggravates this problem with lighter refuse such as paper, plastic jugs and grass clippings.

In recent years, communities and states have developed programs for the segregation and collection of recyclable refuse or commodities to minimize consumption of natural resources and the exhaustion of land fills. As a result, the particular types of recyclable refuse must be segregated from other types of recyclable refuse and from non-recyclable refuse. Consequently, storage bodies and intermediate containers of refuse collection vehicles have been compartmentalized to accommodate the need for segregating recyclable and non-recyclable refuse.

This compartmentalization of the storage body in the intermediate container has created smaller compartments and correspondingly smaller access openings. Due to spacing requirements, the multiple access openings of the multiple compartments are often located adjacent one another. The smaller access openings as well as the closer proximity of the multiple access openings has further increased the need for precise unloading to avoid not only littering of the surrounding environment but also to avoid cross-contamination of the recyclable and non-recyclable refuse. This need for precise unloading of refuse has been further magnified because a wind now has a larger effect on the lighter refuse such as paper, plastic jugs and aluminum cans which are frequently segregated from other larger and heavier refuse.

As a result, there is a continuing need for a method and apparatus for precisely unloading refuse from a container into a storage body or the intermediate container of a refuse collection vehicle and for unloading the refuse from the intermediate container into the storage body of the refuse collection vehicle to avoid littering of the surrounding environment and to avoid cross-contamination of segregated refuse.

SUMMARY OF THE INVENTION

A refuse container includes a plurality of walls defining an interior for containing refuse and a discharge opening. The refuse container further includes a refuse discharge guide adjacent the discharge opening. The refuse discharge guide moves between a first position in which the guide extends away from the opening into the interior for loading refuse and a second position in which the guide extends away from the opening underneath the interior for funneling refuse during unloading.

In one preferred embodiment, the refuse discharge guide pivots between the first position and the second position. In another preferred embodiment, the refuse discharge guide bends between the first position and the second position. In the most preferred embodiment, the refuse discharge guide pivots and bends between the first position and the second position.

In one preferred embodiment, the refuse container is inverted during unloading such that the refuse discharge guide extends adjacent the discharge opening opposite a bottom of the refuse container. In another preferred embodiment, the refuse container includes a bottom door for selectively opening and closing the discharge opening such that the refuse discharge guide extends adjacent the discharge opening and adjacent the bottom door. In one particular preferred embodiment, the refuse container includes first and second doors pivotally coupled to a pair of opposite sides of a discharge opening, wherein the guide extends along at least one intermediate side of the discharge opening. In another preferred embodiment, a refuse container includes a plurality of refuse discharge guides extending along a perimeter of the discharge opening.

In yet another preferred embodiment, each refuse discharge guide includes a plurality of spaced apart protrusions. In a first embodiment, the plurality of spaced apart protrusions are individually mounted along at least one of the plurality of walls adjacent the discharge opening. In a second embodiment, the plurality of spaced apart protrusions are supported by a bar coupled to and along at least one of the plurality of walls adjacent the discharge opening.

DETAILED DESCRIPTION OF THE PREFERRED EMBODIMENTS

Figure 1:
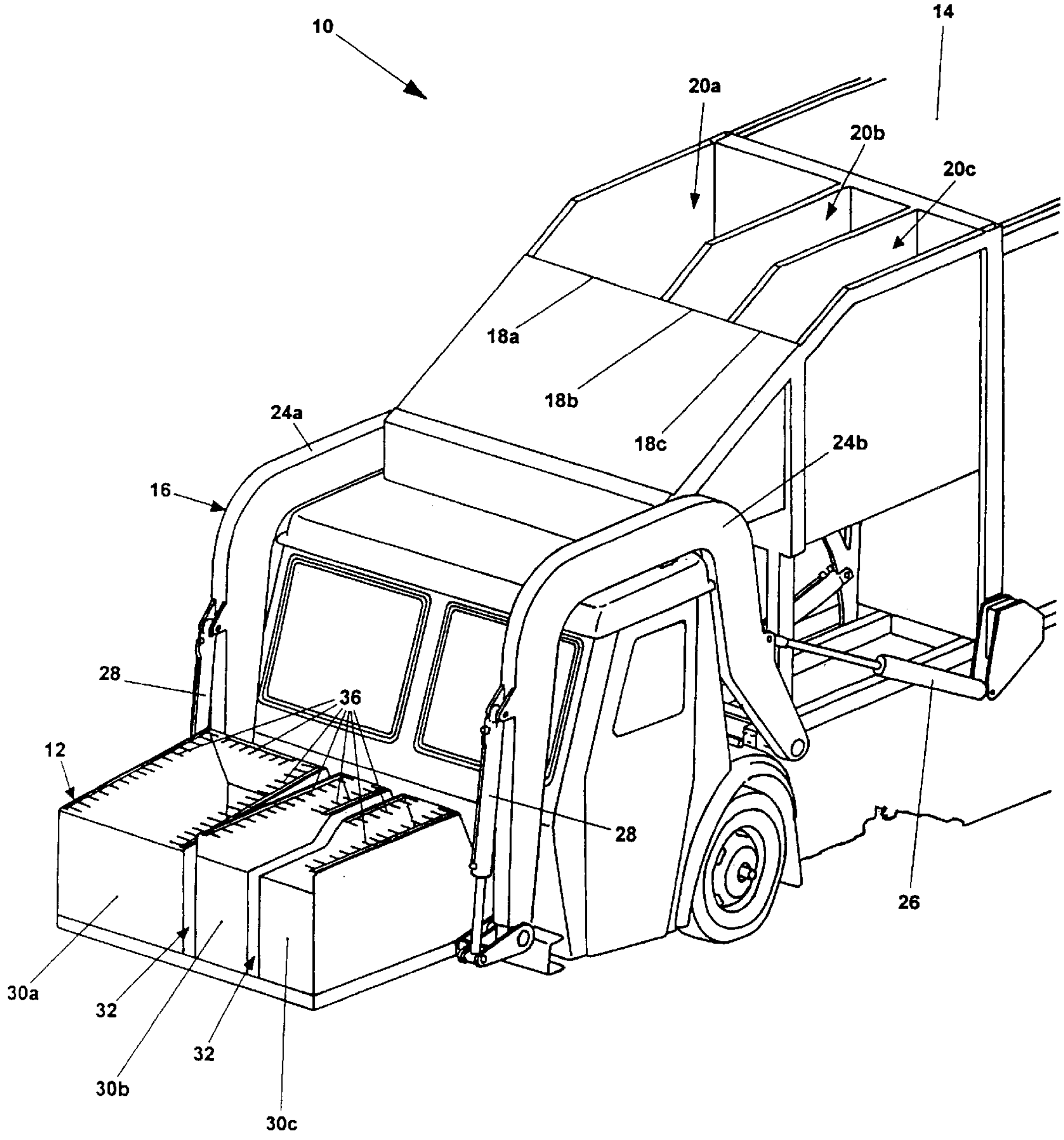
FIG. 1 is a fragmentary perspective view of a front end of a refuse collection vehicle supporting a refuse container in a loading position.

FIG. 1 is a fragmentary perspective view of a front end of a refuse collection vehicle 10 including refuse container 12. Refuse collection vehicle 10 is a conventional front-loader refuse collection vehicle including storage body 14 and dumping assembly 16. Storage body 14 defines a plurality of segregated refuse compartments 18*a*, 18*b* and 18*c*. Compartments 18*a*, 18*b* and 18*c* extend along the length of storage body 14 and are sized for containing and segregating particular types of refuse which must be separated. Compartments 18*a*, 18*b* and 18*c* define corresponding access openings 20*a*, 20*b* and 20*c* which communicate with the respective compartments 18*a*, 18*b* and 18*c*. Access openings 20*a*, 20*b* and 20*c* extend adjacent to one another along an upper side of storage body 14 and are located so as to align with corresponding discharge openings of refuse container 12 during unloading of refuse container 12.

Dumping assembly 16 is conventionally known and used for lifting and emptying contents of container 12 into storage body 14. Dumping assembly 16 generally includes a pair of lifting arms 24*a* and 24*b* and corresponding actuators 26 and 28. Arms 24*a* and 24*b* pivotally extend from refuse collection vehicle 10 for engaging and supporting container 12 forward of refuse collection vehicle 10. Arms 24*a* and 24*b* are lifted by actuators 26. Actuators 28 extend between arms 24*a* and 24*b* for leveling or tilting container 12 as necessary during unloading. Actuators 26 and 28 preferably comprise hydraulic cylinder assemblies which are hydraulically controlled in a conventionally known manner. Actuators 26 and 28 lift arms 24*a* and 24*b* and container 12 upward and rearwardly to empty the contents of container 12 through access openings 20*a*, 20*b* and 20*c* into compartments 18*a*, 18*b* and 18*c*, respectively, of storage body 14.

Container 12 is supported by arms 24*a* and 24*b* forward of refuse collection vehicle 10 and is sized for receiving and containing refuse to be unloaded into storage body 14. In the preferred embodiment illustrated, container 12 includes bins 30*a*, 30*b* and 30*c* for receiving and containing refuse which must be segregated. Bins 30*a*, 30*b* and 30*c* are preferably sized and spaced apart from one another to match the size and location of access openings 20*a*, 20*b* and 20*c*, respectively, upon container 12 being raised and inverted by dumping mechanism 16. Bins 30*a*, 30*b* and 30*c* are preferably connected together and supported as a single unitary structure that forms container 12. Bins 30*a*, 30*b* and 30*c* are preferably spaced from one another by elongate slots 32. Slots 32 receive corresponding divider walls positioned within access openings 20*a*, 20*b* and 20*c* to insure proper alignment of bins 30*a*, 30*b* and 30*c* with access openings 20*a*, 20*b* and 20*c*, respectively.

As further shown by FIG. 1, each bin 30*a*, 30*b* and 30*c* includes at least one discharge guide 36. Refuse discharge guides 36 extend at least partially about a perimeter of bins 30*a*, 30*b* and 30*c*. Refuse discharge guides 36 permit refuse to be easily loaded into bins 30*a*, 30*b* and 30*c*. At the same time, refuse discharge guides 36 channel or funnel refuse being dumped from bins 30*a*, 30*b* and 30*c* to insure that all of the refuse is properly deposited through access openings 20*a*, 20*b* and 20*c* into compartments 18*a*, 18*b* and 18*c*, respectively. As a result, refuse discharge guides 36 prevent littering of the surrounding environment and also avoid cross-contamination of segregated refuse.

Figure 2:
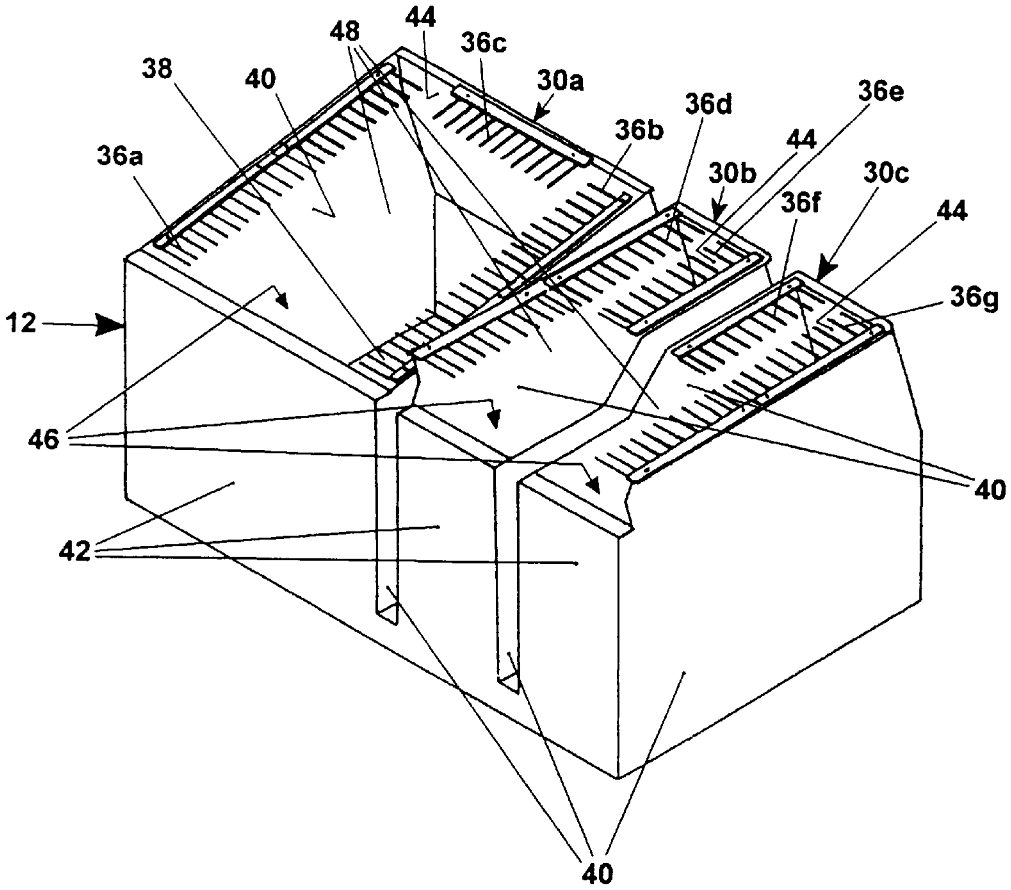
FIG. 2 is an enlarged perspective view of the refuse container of FIG. 1 including refuse discharge guides.
Figure 3:
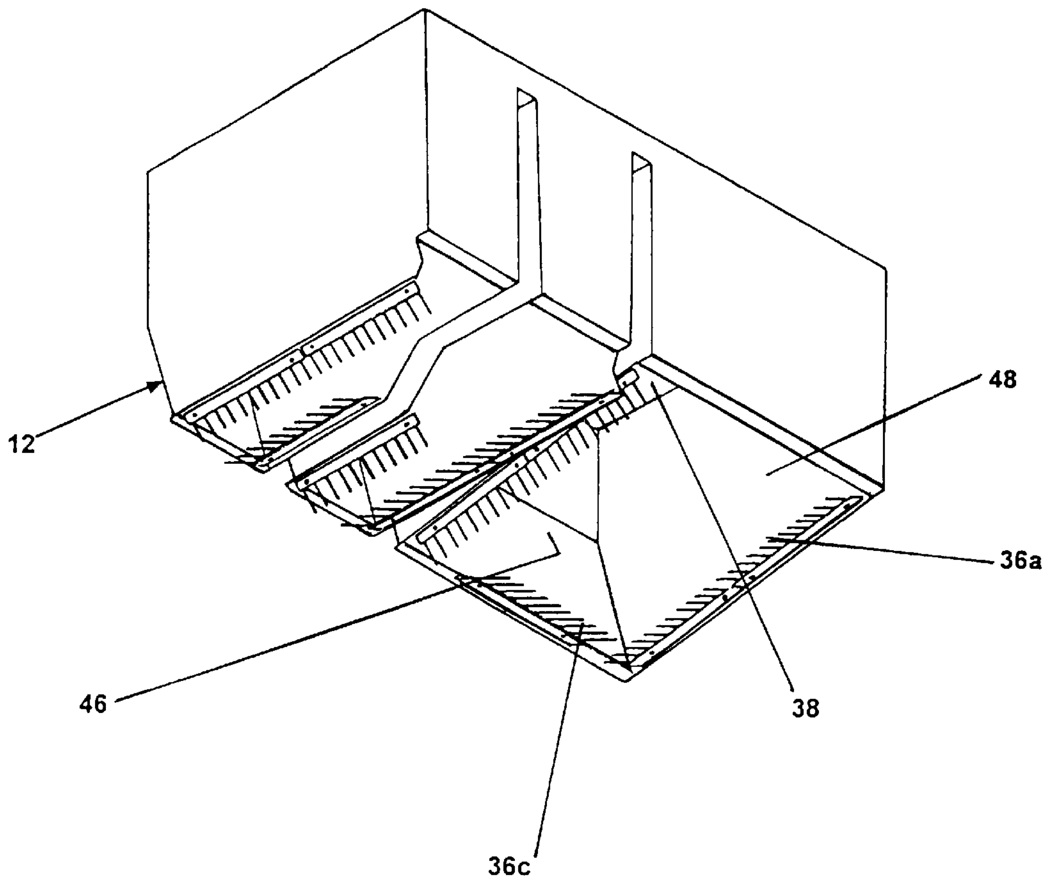
FIG. 3 is a n enlarged perspective view of the container of FIG. 1 in an invert ed unloading position.

FIGS. 2 and 3 illustrate container 12 and refuse discharge guides 36 in greater detail. FIG. 2 is a perspective view illustrating container 12 in an upright loading position. FIG. 3 is a perspective view illustrating container 12 in an inverted unloading position. As shown by FIGS. 2 and 3, each of bins 30*a*, 30*b* and 30*c* includes a bottom 38, side walls 40, front wall 42 and rear wall 44. Side walls 40, front wall 42 and rear wall 44 extend from bottom 38 to define an interior 46 and a load-discharge opening 48. Interior 46 is a generally hollow cavity surrounded by bottom 38, walls 40, 42, 44 and opening 48. Opening 48 communicates with interior 46 and extends substantially along at least one horizontal plane. Opening 48 has a perimeter defined by the upper edges of walls 40, 42 and 44. Although bins 30*a*, 30*b* and 30*c* are illustrated as substantially rectangular individual containers having substantially rectangular interiors 46 and substantially rectangular openings 48, bins 30*a*, 30*b* and 30*c* may alternatively have any of a variety of different shapes and configurations depending upon the type and amount of refuse being contained by the individual bins, the overall number and size of bins as well as the particular size and configuration of access openings 20*a*, 20*b* and 20*c*.

Refuse discharge guides 36 extend adjacent discharge openings 48 of each bin 30*a*, 30*b* and 30*c*. In particular, bin 30*a* includes refuse discharge guides 36*a*, 36*b* and 36*c*. Refuse discharge guides 36*a* and 36*b* extend along opposite side walls 40 of bin 30*a* adjacent discharge opening 48. Refuse discharge guide 36*c* extends along an upper edge of rear wall 44 adjacent discharge opening 48 of bin 30*a*. Similarly, bin 30*b* includes refuse discharge guide 36*d* and 36*e*. Refuse discharge guides 36*d* and 36*e* extend along opposite side walls 40 of bin 30*b*. Lastly, bin 30*c* includes refuse discharge guides 36*f* and 36*g*. Refuse discharge guides 36*f* and 36*g* extend along opposite side walls 40 of bin 30*c*. Refuse discharge guides 36*a*–36*g* preferably extend from corresponding walls over interiors 46 within the same planes containing discharge openings 48. In this neutral position, discharge guides 36*a*–36*g* partially cover interiors 46 to prevent refuse deposited within interiors 46 from falling or blowing out of container 12.

As best shown by FIG. 3, upon inversion of container 12, refuse discharge guides 36*a*–36*g* pivot into a discharge position for unloading or discharging refuse from container 12. In the discharge position, refuse discharge guides 36*a*–36*g* extend in a plane oblique to the plane containing discharge opening 48. In the preferred embodiment illustrated, refuse discharge guides 36*a*–36*g* extend away from discharge opening 48 and away from bottom 38 beneath interior 46. Each discharge guide 36*a*–36*g* extends away from discharge opening 48 and bottom 38 towards an opposing wall. For example, refuse discharge guide 36*a* extends downwardly away from discharge opening 48 and bottom 38. Refuse discharge guide 36*c* also extends downwardly away from discharge opening 48 and bottom 38. The remaining discharge guides 36 are similarly positioned. As a result, discharge guides 36*a*–36*g* engage refuse falling from interior 46 so as to funnel or channel refuse away from the corresponding walls supporting the corresponding refuse discharge guides 36*a*–36*g*. Consequently, refuse falling from each bin 30*a*, 30*b* and 30*c* is more likely to fall through a correct corresponding access opening 20*a*, 20*b* and 20*c* into a correct compartment 18*a*, 18*b* and 18*c* (shown in FIG. 1). Accordingly, undesirable littering and cross-contamination of segregated refuse is avoided.

Figure 4:
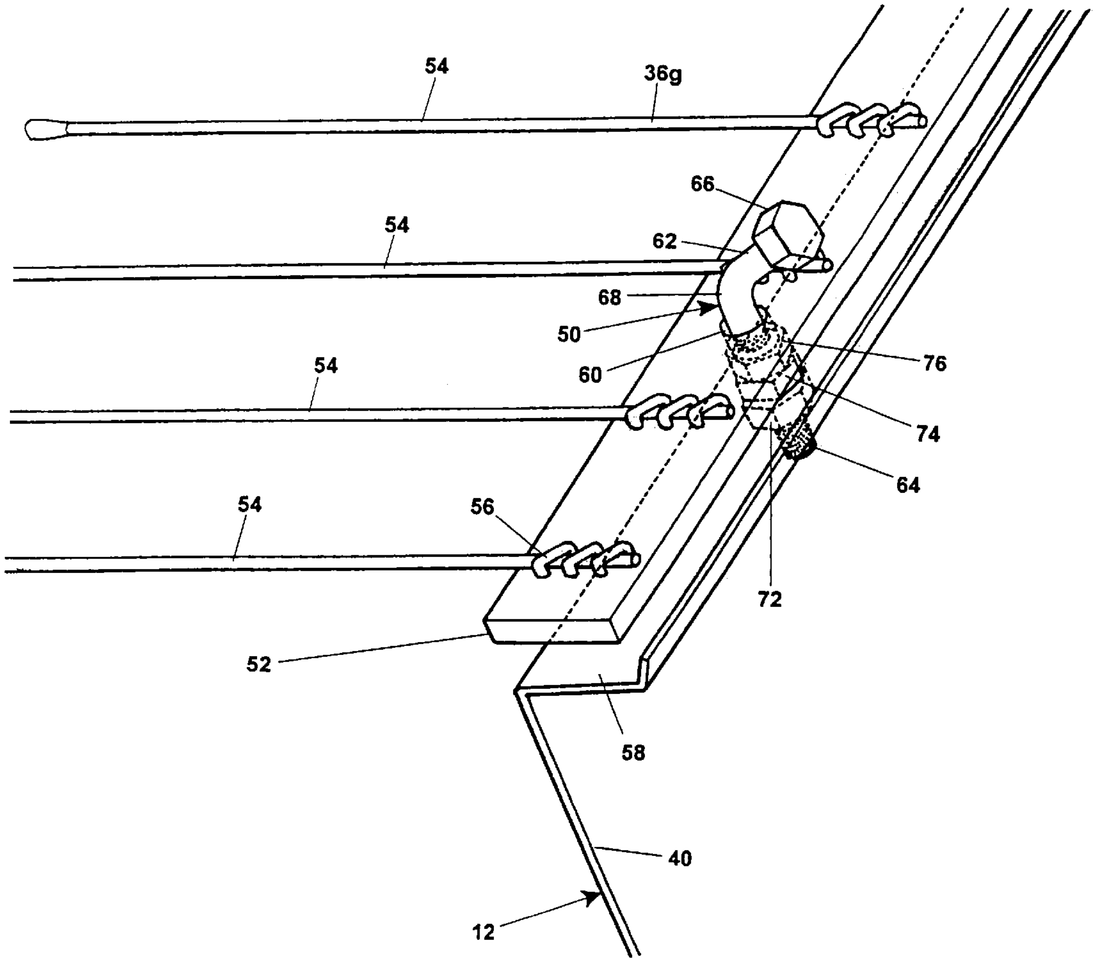
FIG. 4 is an enlarged fragmentary perspective view illustrating the refuse discharge guide coupled to the container.

FIG. 4 is a fragmentary perspective view illustrating refuse discharge guide 36*g* pivotally coupled to side wall 40 by pivot mechanism 50. Refuse discharge guides 36*a*–36*f* are substantially identical to refuse discharge guide 36*g* and are similarly coupled to corresponding walls by similar pivot supports 50. As best shown by FIG. 4, refuse discharge guide 36*g* includes support bar 52, channeling fingers 54 and finger mounts 56. Support bar 52 is a generally elongate body configured for supporting channeling fingers 54 and for extending along a wall of the container such as side wall 40. In the preferred embodiment illustrated, support bar 52 rests upon a landing 58 defined along an upper edge of wall 40 so as to support channeling fingers 54 in the neutral position when container 12 is in the upright position. Alternatively, as shown by FIGS. 5–9, landing 58 may be downwardly angled so as to support bar 52 and outwardly extending channeling fingers 54 for a load position in which channeling fingers 54 extend away from discharge opening 48 into interior 48 towards bottom 38.

Channeling fingers 54 generally comprise a plurality of spaced apart protrusions extending from support bar 52. In the preferred embodiment, channeling fingers 54 comprise elongate resiliently deformable tines having one end fixedly coupled to support bar 52 by finger supports 56. Finger mounts 56 comprise conventionally known staples. Alternatively, channeling fingers 54 may be fixedly coupled to support bar 52 by any of a variety of well known alternative fasteners. Furthermore, channeling fingers 54 may alternatively be integrally formed as part of a single unitary body with support bar 52. In the preferred embodiment illustrated, channeling fingers 54 extend from wall 40 by a distance of eight inches. In the preferred embodiment illustrated, channeling fingers 54 are preferably formed from a resilient flexible material such as conventionally known metal cable having a 0.125 inch outer diameter and protective plastic coating. Channeling fingers preferably have a length long enough so as to sufficiently funnel refuse during unloading but small enough so that refuse can easily fall through discharge opening 48 past ends of channeling fingers 54 without being held up by channeling fingers 54. In the preferred embodiment illustrated, channeling fingers 54 are spaced from one another by a distance of six inches.

Pivot mechanism 50 pivotally couples support bar 52 to wall 40 so as to enable channeling fingers 54 to pivot from the neutral position to the discharge position. Pivot mechanism 50 includes bore 60 and pivot shaft 62. Bore 60 extends through support bar 52 and is sized for slidably receiving shaft 62. Shaft 62 extends through bore 60 and includes mounting portion 64, axial stop 66 and pivot portion 68. Mounting portion 64 of shaft 62 fixedly mounts shaft 62 to wall 40. In the preferred embodiment illustrated, mounting portion 64 fixedly couples shaft 62 to landing 58 of wall 40.

Axial stop 66 extends at an end of shaft 62 opposite mounting portion 64. Axial stop 66 has a diameter greater than the diameter of bore 60 so as to capture support bar 62 between mounting portion 64 and axial stop 66. Pivot portion 68 extends between mounting portion 64 and axial stop 66 and has an outer diameter less than the inner diameter of bore 60. As a result, support bar 52 slides between mounting portion 64 and axial stop 66 along pivot portion 68 so as to pivot support bar 52 and channeling fingers 54 between the neutral and discharge positions. In the preferred embodiment illustrated, pivot portion 68 angles outwardly away from opening 48 and bottom 38. As a result, support bar 52 and channeling fingers 54 which move along the axis of pivot portion 68 also pivot. In the preferred embodiment illustrated, shaft 62 preferably compromises a threaded bolt secured to wall 40 by nuts 72, 74 and 76. Nuts 72 and 74 threadably engage shaft 62 on opposite sides of wall 40 so as to secure shaft 62 to wall 40. Nut 76 serves as a spacer to space support bar 52 above landing 58. Alternatively, shaft 62 may be fixedly coupled to wall 40 by other well known fastener means such as other well known fasteners or by welding.

Figure 5:
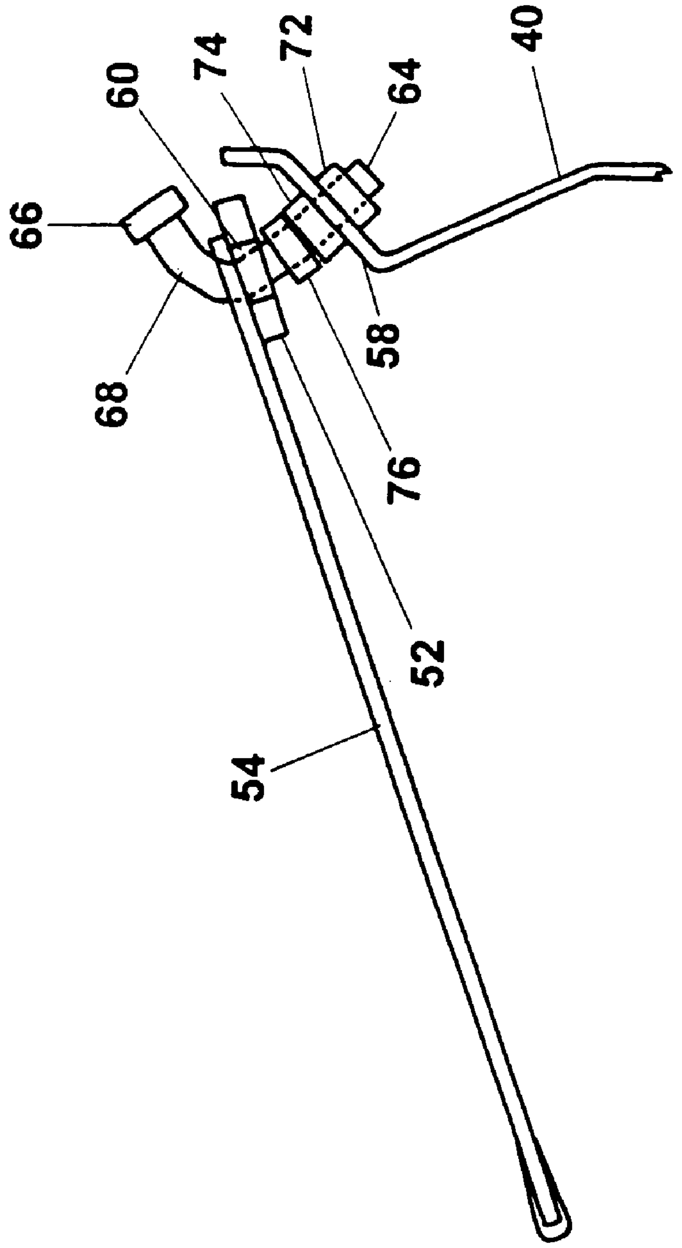
FIG. 5 is an enlarged side elevational view of the refuse discharge guides in a loading position and coupled to a second embodiment of the container.
Figure 6:
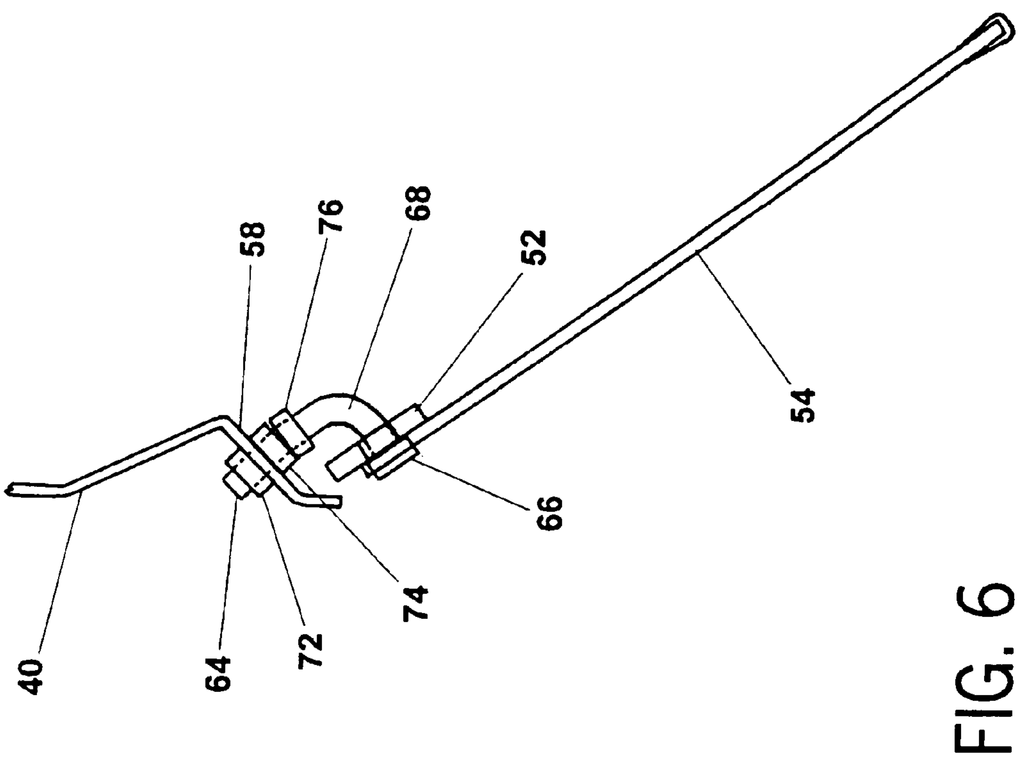
FIG. 6 is an enlarged side elevational view of the refuse discharge guides in an unloading position coupled to a second embodiment of the container.

FIGS. 5 and 6 illustrate the moving of channeling fingers 54 between the load and discharge positions, respectively. As shown by FIG. 5, in the load position, support bar 52 rests against spacer 76 which is in turn supported at a downwardly sloped angle by landing 58. As a result, support 52 and channeling fingers 54 extend into interior 46 towards bottom 38 (shown in FIG. 2). Because channeling fingers 54 extend inwardly into interior 46 towards bottom 38, the projection of fingers 54 over interior 46 is minimized. As a result, refuse is more easily loaded into container 12.

As shown by FIG. 6, in the discharge position, inversion of container 12 causes support bar 52 to downwardly slide along shaft 62 with the assistance of gravity until support bar 52 engages head 66. Because shaft 62 is outwardly angled away from interior 46 and bottom 38, support bar 62 and channeling fingers 54 which extend generally perpendicular to shaft 62 extend away from opening 48 underneath interior 46 for funneling refuse away from wall 40 towards a central location below interior 46.

Although pivot mechanism 60 is illustrated as an outwardly angled bolt fixedly coupled to a wall of the container for guiding movement of support bar 52 and channeling fingers 54 along the axial length of the bolt, pivot mechanism 50 may alternatively comprise any one of alternative pivot arrangements. For example, support bar 52 and channeling fingers 54 may alteratively be pivotally coupled to wall 40 adjacent discharge opening 48 by an alternative pivot mechanism including an elongate slot and a substantially linear pin extending through the slot and coupling the support bar 52 and channeling fingers 54 to wall 40. In such an alternative arrangement, the elongate slot would extend perpendicular to wall 40 so as to enable bar 52 to pivot between the load position and the discharge position. Furthermore, in lieu of channeling fingers 54 being fixedly coupled to support bar 52 which is pivotally coupled to wall 40, channeling fingers 54 may alternatively be individually pivotally coupled to wall 40 with individual pivot mechanisms 50.

Although refuse discharge guides 36 are each illustrated as including a plurality of spaced apart channeling fingers 54, refuse discharge guides 36*a*–36*g* may alternatively comprise elongate panels supported adjacent discharge opening 48 so as to move between a load position in which the guide extends away from the opening into the interior for loading refuse and a discharge position in which the guide extends away from the opening underneath the interior for funneling refuse during unloading. Preferably, the alternative panels are formed from a resilient, flexible material such as rubber or similar materials.

Figure 7:
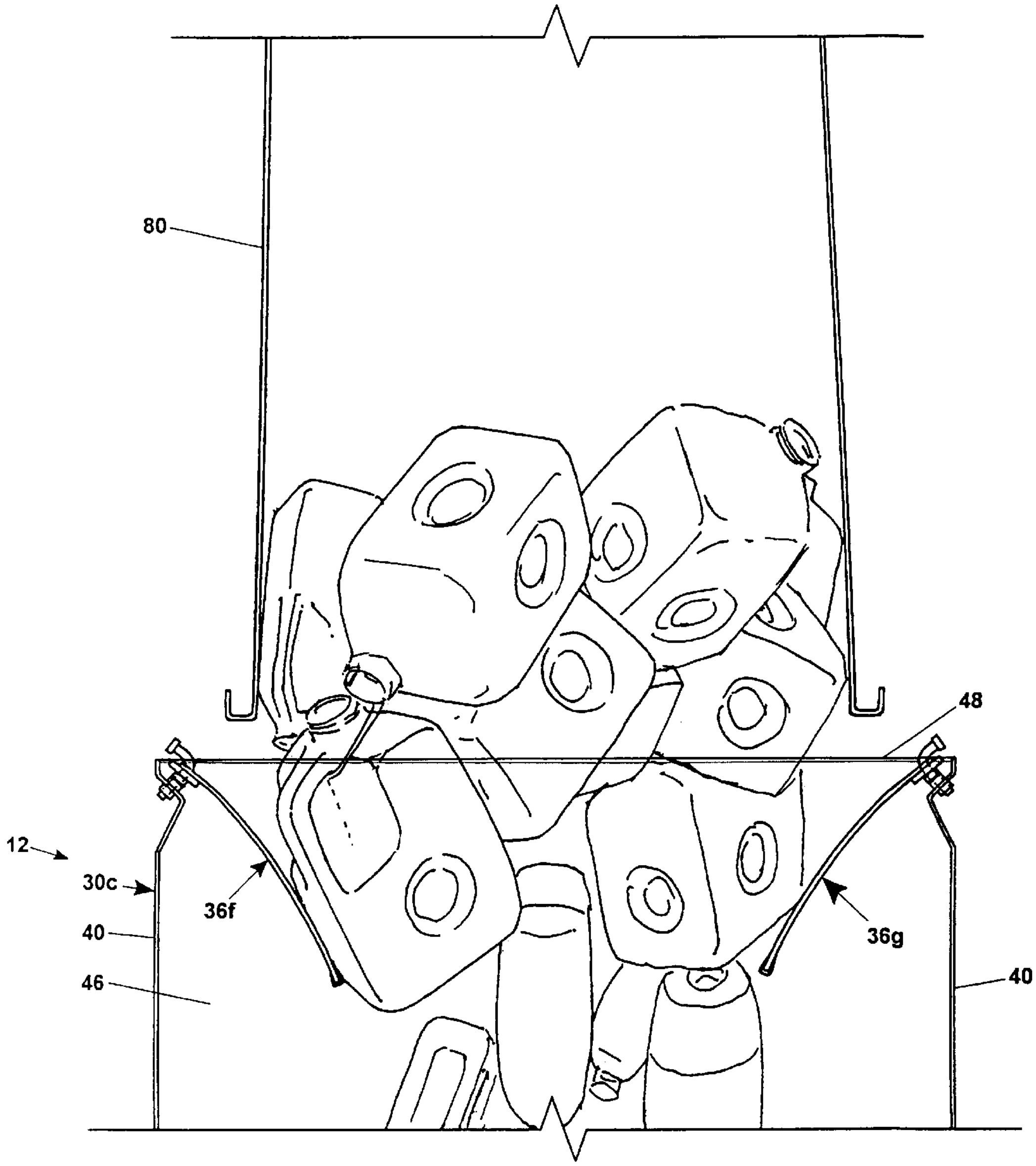
FIG. 7 is a sectional view illustrating refuse being unloaded into a second embodiment of the container.
Figure 8:
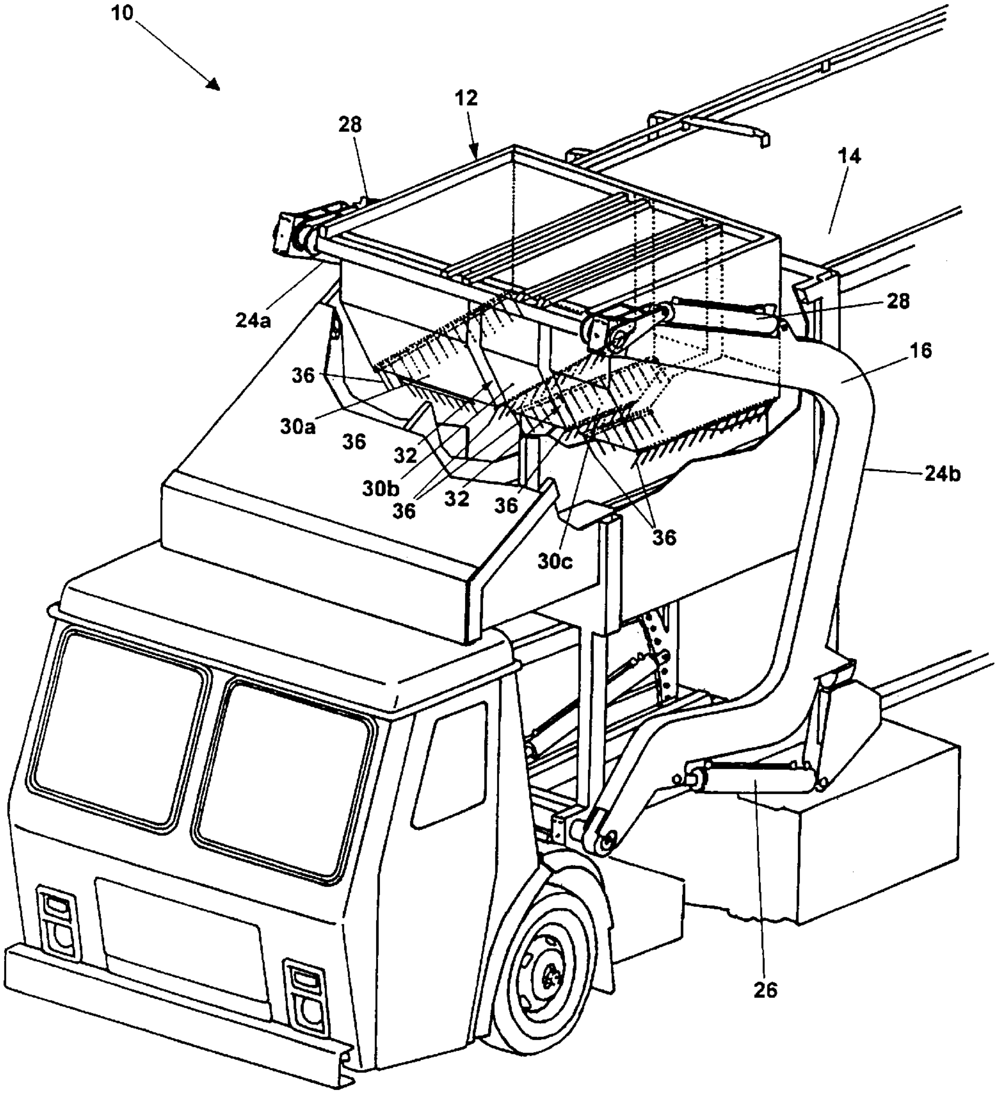
FIG. 8 is a fragmentary perspective view of a front end of the refuse collection vehicle supporting the container in an unloading position.
Figure 9:
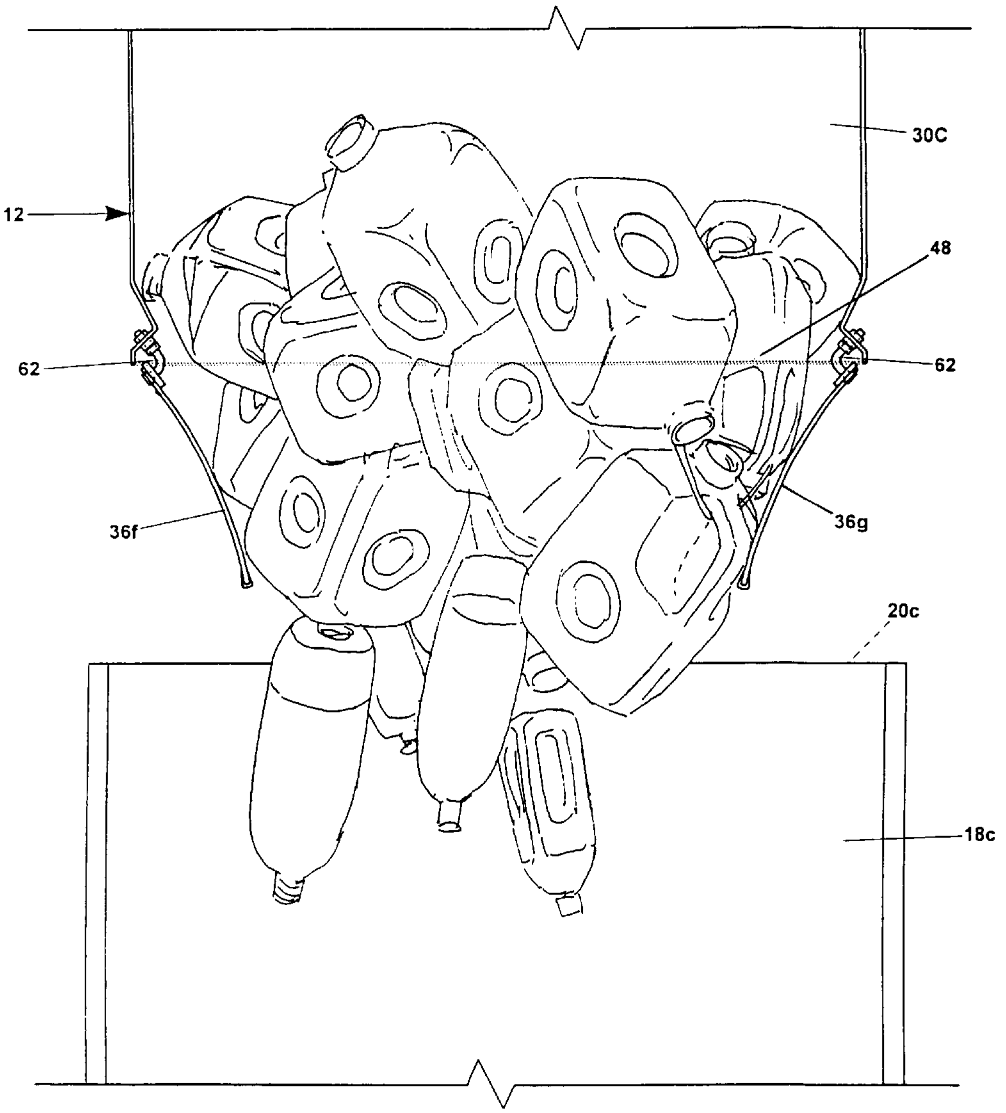
FIG. 9 is a sectional view illustrating refuse within the container being unloaded into the refuse collection vehicle.

FIGS. 7, 8 and 9 illustrate the loading and unloading of bins 30*a*, 30*b* and 30*c* of container 12 in greater detail. FIG. 7 illustrates refuse being unloaded from a standard refuse container 80 into bin 30*c* of container 12. For ease of illustration, bins 30*a* and 30*b* of container 12 are omitted. As best shown by FIG. 7, refuse discharge guides 36*f* and 36*g* extend away from load-discharge opening 48 (shown in phantom) into interior 46 towards bottom 38 (shown in FIG. 2) when container 12 is supported in the upright position. As a result, refuse discharge guides 36*f* and 36*g* extend at an angle inward for better receiving refuse being unloaded from container 80. As further shown by FIG. 7, refuse discharge guides 36*f* and 36*g* flex or bend inwardly towards wall 40 to facilitate loading of refuse into bin 30*c* of container 12.

FIGS. 8 and 9 illustrate container 12 inverted by dumping mechanism 16 so as to unload refuse from container 12 into storage body 14. FIG. 9 illustrates refuse being unloaded from bin 30*c* through access opening 20*c* into compartment 18*c*. For ease of illustration, bins 30*a* and 30*b* as well as compartments 18*a* and 18*b* are omitted. As shown by FIG. 8, dumping mechanism 16 lifts and tilts container 12 so as to invert container 12 over access openings 20*a*, 20*b* and 20*c* of storage body 14. Complete inversion of container 12 results in discharge openings 48 of bins 30*a*, 30*b* and 30*c* being aligned and preferably nested within access openings 20*a*, 20*b* and 20*c*, respectively, of compartments 18*a*, 18*b* and 18*c*, respectively. However, prior to full inversion of container 12, refuse begins to fall from container 12 due to gravity. During inversion of container 12, refuse discharge guides 36 also move to the discharge position. As a result, refuse discharge guides 36 funnel the refuse falling from container 12 through the corresponding aligned access opening 20*a*, 20*b* and 20*c* into the correct compartment 18*a*, 18*b* and 18*c*.

FIG. 9 illustrates the unloading of refuse from container 12 into storage body 14 in greater detail. As shown by FIG. 9, during inversion of container 12, refuse discharge guides 36*f* and 36*g* slide along shaft 62 with the assistance of gravity to the discharge position. In the discharge position, refuse discharge guides 36*f* and 36*g* extend away from load-discharge opening 48 (shown in phantom) beneath interior 46 and away from bottom 38 (shown in FIG. 2) so as to funnel refuse falling from bin 30*c* of container 12 away from wall 40 towards a central location below interior 46. As a result, refuse discharge guides 36*f* and 36*g* accurately funnel the refuse through access opening 20*c* of compartment 18*c* to prevent the refuse from falling through adjacent access openings and to prevent the refuse from falling to the ground surrounding the refuse collection vehicle. Consequently, refuse discharge guides 36*f* and 36*g* eliminate littering of the surrounding environment and prevent cross-contamination of segregated refuse and commodities. As further shown by FIG. 9, refuse discharge guides 36*f* and 36*g* are resiliently flexible such that upon engaging the refuse falling from bin 30*c* of container 12, refuse discharge guides 36*f* and 36*g* resiliently bend or flex downwardly and outwardly towards access opening 20 to facilitate improved refuse flow and to prevent the refuse from jamming. However, refuse discharge guides 36*f* and 36*g* are preferably sufficiently rigid so as to partially funnel refuse during unloading.

Because refuse discharge guides 36 are preferably formed from resiliently flexible or deformable material, refuse discharge guides 36 automatically and appropriately adapt to the particular type of refuse being unloaded to maximize discharge flow rate and minimize spillage and cross-contamination. For example, heavier refuse is less likely to be affected by wind or other effects which tend to cause spillage and cross-contamination. The heaver refuse will naturally deform discharge guides 36 to enlarge the opening formed between ends of discharge guides 36 and to increase the flow rate. Lighter refuse, however, is more susceptible to wind and other effects which tend to cause the lighter refuse to spill or become cross-contaminated with other refuse. Refuse discharge guides 36 minimally deform upon engagement with lighter refuse. As a result, refuse discharge guides 36 funnel or channel the lighter refuse to a larger extent as compared to heavier refuse.

Figure 10:
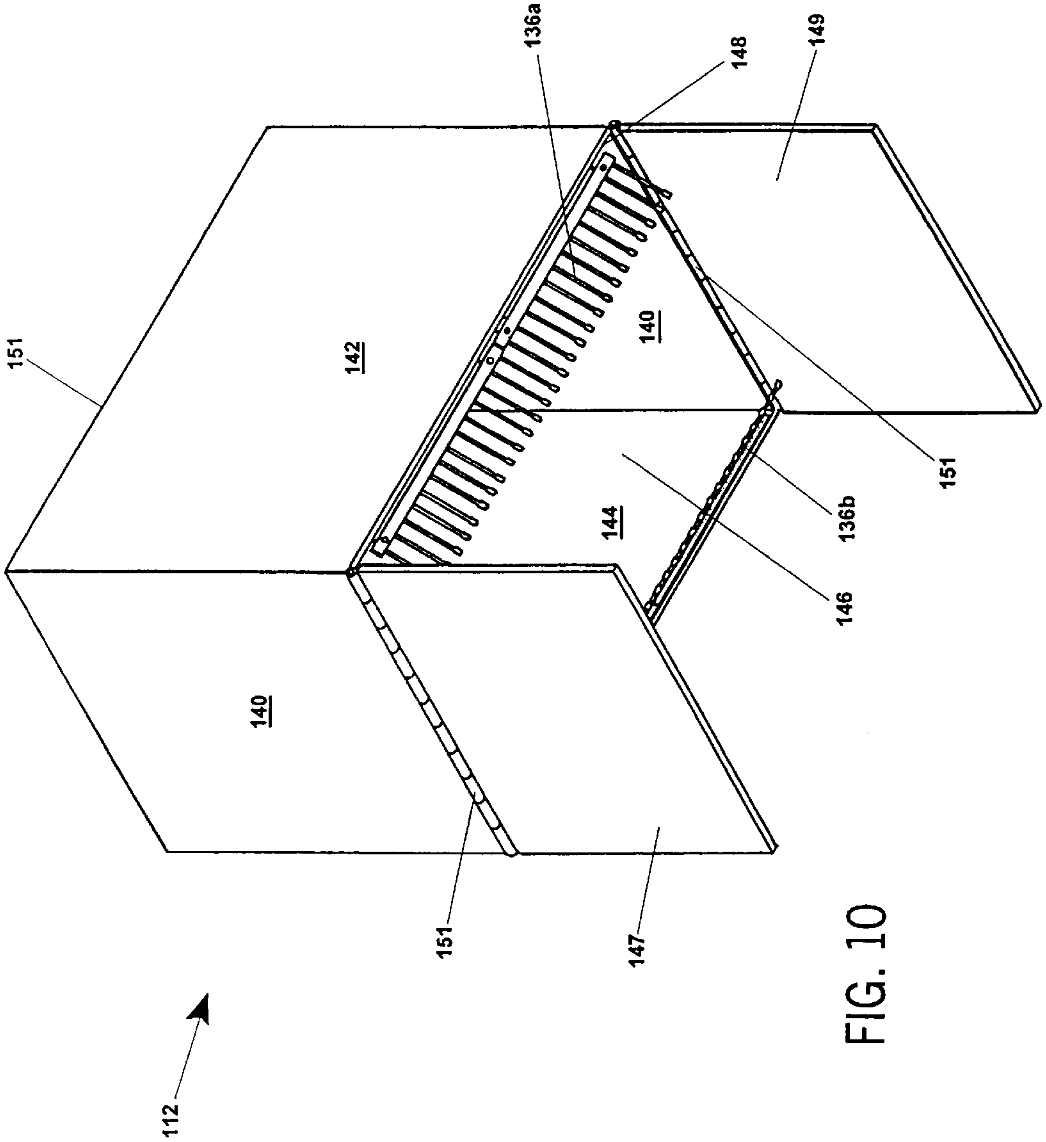
FIG. 10 is a perspective view illustrating a third embodiment of the container.

FIG. 10 is a perspective view illustrating container 112, an alternative embodiment of container 12. In contrast to container 12, container 112 is configured for being maintained in an upright position during both loading and unloading of refuse from container 112. Container 112 includes side walls 140, front wall 142, rear wall 144 and bottom doors 147 and 149. Side walls 140, front wall 142, rear wall 144 and bottom doors 147 and 149 define an interior 46, a load opening 151 and a discharge opening 148. Load opening 151 extends opposite discharge opening 148 above interior 146. Discharge opening 148 extends adjacent bottom doors 147 and 149 and is selectively opened or closed by actuation of bottom doors 147 and 149. Bottom doors 147 and 149 are pivotally coupled to side walls 140 by hinges 151. Bottom doors 147 and 149 pivot between a first closed position (not shown) in which discharge opening 148 is closed for loading of interior 146 with refuse through load opening 151 and an open position for unloading refuse through discharge opening 148.

As further shown by FIG. 10, container 112 includes refuse discharge guides 136*a* and 136*b*. Refuse discharge guides 136*a* and 136*b* are substantially identical to refuse discharge guides 36. Refuse discharge guides 136*a* and 136*b* extend along front wall 142 and rear wall 144, respectively. Refuse discharge guides 136*a* and 136*b* are preferably pivotally coupled to front wall 142 and rear wall 144 slightly above bottom doors 147 and 149 and discharge opening 148. During loading of container 112 through load opening 151, bottom doors 147 and 149 are in the closed position so as to support refuse discharge guides 136*a* and 136*b* above discharge opening 148 within interior 146 of container 112. During unloading of refuse from container 112, container 112 is elevated above an access opening of a storage compartment so as to align discharge opening 148 with the access opening of the storage compartment. Once compartment 112 is aligned, bottom doors 147 and 149 are opened to permit refuse discharge guide 136*a* and 136*b* to pivot or swing downwardly away from discharge opening 148 underneath interior 144 for funneling refuse within interior 146 into the storage compartment. In the preferred embodiment illustrated, refuse discharge guides 136*a* and 136*b* extend downwardly toward an opposing wall so as to funnel refuse towards a central location below interior 146. As discussed above, refuse discharge guides 136*a* and 136*b* may have a variety of alternative configurations and may be pivotally coupled to walls 142 and 144 by a variety of pivot mechanisms. Moreover, although refuse discharge guides 136*a* and 136*b* are illustrated as both pivoting and flexing between the load and discharge positions, refuse discharge guides 136*a* and 136*b* may alternatively pivot or flex a sufficient distance for permitting refuse to be loaded into container 112 or discharged from container 112.

Figure 11:
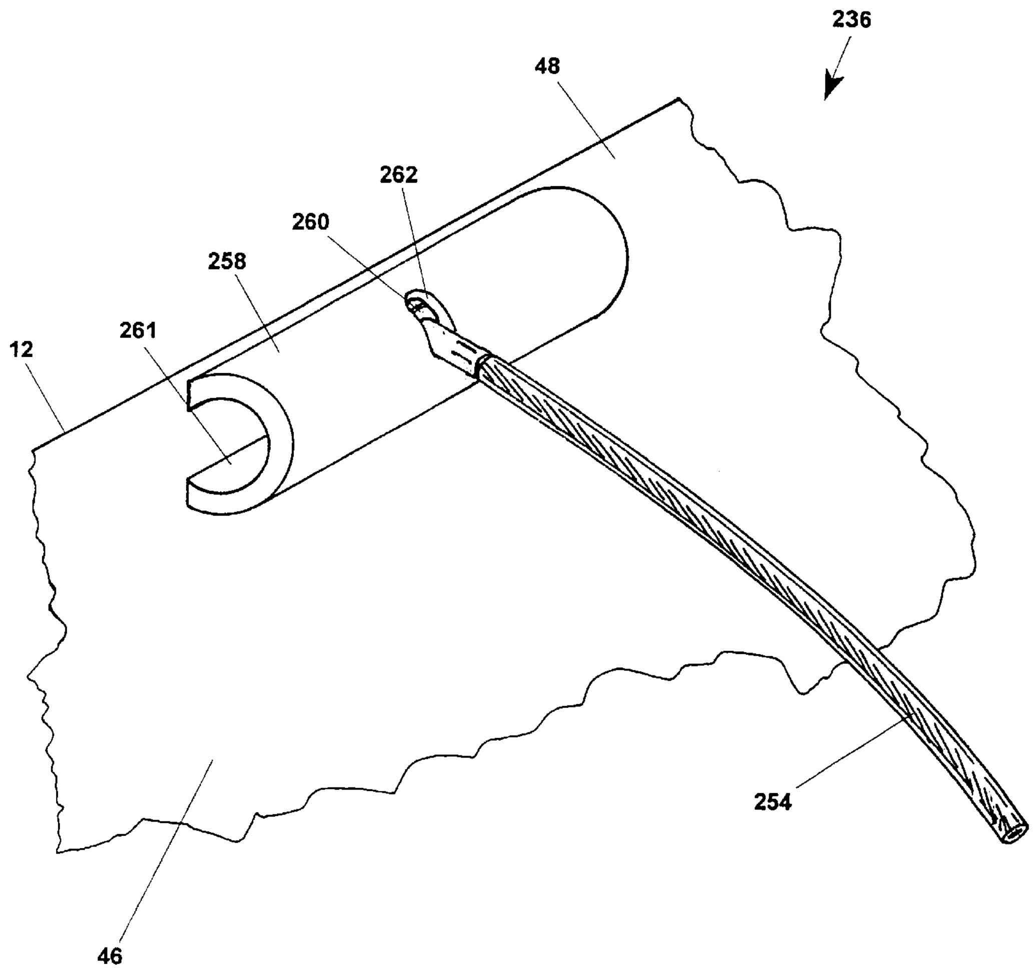
FIG. 11 is an enlarged fragmentary perspective view illustrating a second embodiment of the refuse discharge guide coupled to the container.

FIG. 11 is a perspective view illustrating refuse discharge guide 236, an alternative embodiment of refuse discharge guides 36 and 136, mounted to container 12. Refuse discharge guide 236 preferably includes a multitude of channeling fingers 254 supported and spaced along container 12 by pivot support 258. However, for ease of illustration, FIG. 11 illustrates a single channeling finger 254 supported along a section of pivot support 258. Each channeling finger 254 preferably comprises an elongate resiliently flexible member extending from pivot support 258. Each channeling finger 254 preferably comprises a plastic coated cable. In the preferred embodiment illustrated, channeling finger 254 comprises a length of 0.125 inch diameter steel cable dipped in a plastic coating. Channeling fingers 254 are preferably sufficiently flexible so as to substantially deform or flex in response to the application of force to channeling fingers 254. As a result, during loading of a container, channeling fingers 254 flex downwardly into the container upon being engaged by loaded refuse to permit easy loading of the container. At the same time, during unloading of the container, channeling fingers 254 flex away from the opening beneath the interior of the container for funneling refuse. Channeling fingers 254 preferably have a length long enough so as to sufficiently funnel refuse during unloading and a length that is small enough so that refuse can easily fall through the discharge opening past the ends of the channeling fingers 254 without being held up by the channeling fingers 254.

As further shown by FIG. 11, each channeling finger 254 additionally includes a pivot head 260 at one end for being pivotably captured by pivot support 258. In the preferred embodiment illustrated, head 260 comprises a head of a ferrule that is crimped over an end of channeling finger 254. Alternatively, head 260 may be coupled to an end of channeling finger 254 by adhesives, welding and other fastening methods. Moreover head 260 may alternatively be integrally formed as part of channeling finger 254.

Pivot support 258 is a generally elongate partially hollow member fixedly coupled to container 12 adjacent discharge opening 48. Pivot support 258 is preferably coupled to container 12 with bolts, screws, rivets, adhesive, welding or other attachment mechanisms. Pivot support 258 preferably has C-shaped cross section defining hollow 261 and slot 262. Hollow 261 is formed within the concave portion of support 258 and is sized for movably receiving head 260 of each channeling finger 254. Elongate slot 262 extends through support 258 and has a width greater than the diameter of channeling finger 254 but less than the width of head 260. As a result, once pivot support 258 is secured to container 12, head 260 is captured within hollow 261 between pivot support 258 and container 12. Slot 262 allows head 260 and channeling finger 254 to pivot relative to container 12 and discharge opening 48. Slot 262 preferably has a length sized so as to permit channeling finger 254 to pivot away from opening 48 and away from interior 46 during unloading of container 12. In the embodiment illustrated in FIG. 11, slot 262 is sized such that pivot support 258 supports channeling finger 254 in a neutral position parallel to opening 48 when container 12 is upright during loading. Alternatively, the size and orientation of slot 262 relative to pivot support 258 may be varied depending upon the direction and degree of movement required of channeling finger 254 to facilitate loading and unloading of refuse into and from container 12.

Overall, refuse discharge guides 36, 136 and 236 enable refuse to be precisely unloaded from a refuse container without littering of the surrounding environment and without cross-contamination of recyclables and non-recyclable refuse. At the same time, refuse discharge guides 36 extend inwardly towards the bottom of the container during loading to facilitate loading of the container without obstructing the flow of refuse into the container. Due to their simple and inexpensive construction, refuse discharge guides 36, 136 and 236 enable existing containers to be easily modified and adapted to eliminate the problems of littering and cross-contamination.

Although refuse discharge guides 36, 136 and 236 have been illustrated for use on an intermediate container of a front loader refuse collection vehicle, refuse discharge guides 36, 136 and 236 may alternatively be utilized on a wide variety of refuse containers in conjunction with a wide variety of refuse collection vehicles or independent of a refuse collection vehicle. For example, refuse discharge guides 36, 136 and 236 may be employed on a single compartment intermediate container of a refuse collection vehicle. Refuse discharge guides 36, 136 and 236 may alternatively be employed on an intermediate container of a side or rear loader refuse collection vehicle. Moreover, refuse discharge guides 36 may be used on a container independent of the refuse collection vehicle such as a single or multi-compartment dumpster or a single compartment refuse receptacle such as a garbage can. As discussed above, refuse discharge guides 36, 136, and 236 may alternatively be formed from a variety of alternative materials and may have a variety of different sizes and configurations depending upon the particular container as well as the particular refuse intended to be collected within the container.

Although the present invention has been described with reference to preferred embodiments, workers skilled in the art will recognize that changes may be made in form and detail without departing from the spirit and scope of the invention.

What is claimed is:

1. A refuse container comprising:

a plurality of walls defining an interior for containing refuse and a discharge opening for discharging refuse from the container under the force of gravity;

a first discharge guide extending from a first perimeter portion of the discharge opening and including at least one first free end; and a second discharge guide extending from a second opposite perimeter portion of the discharge opening and including at least one second free end, wherein each guide is configured to move between a first position in which its free end extends away from the opening into the interior for loading refuse and a second position in which its free end extends away from the opening underneath and away from the interior for funneling refuse during unloading, whereby its free end is not positioned in the interior during unloading.

2. The refuse container of claim 1 wherein the container is inverted during unloading and wherein the container has a bottom opposite the discharge opening.

3. The refuse container of claim 1 including:

a load opening opposite the discharge opening; and a bottom door coupled to at least one of the plurality of walls for selectively opening and closing the discharge opening.

4. The refuse container of claim 3 wherein the bottom door extends along a first portion of the discharge opening and wherein the first guide extends along a second portion of the discharge opening.

5. The refuse container of claim 1 including:

a load opening opposite the discharge opening; and a first and second bottom doors pivotally coupled to the plurality of walls along opposite sides of the discharge opening, wherein the first guide extends along an intermediate side of the discharge opening.

6. The refuse container of claim 1 including:

a third discharge guide extending from a third perimeter portion of the discharge opening, wherein the third guide is configured to move between a first position in which its free end extends away from the opening into the interior for loading refuse and a second position in which its free end extends away from the opening underneath and away from the interior for funneling refuse during unloading.

7. The refuse container of claim 1 wherein the first guide includes:

a plurality of spaced apart protrusions.

8. The refuse container of claim 7 wherein the plurality of spaced apart protrusions are individually mounted along at least one of the plurality of side walls adjacent the discharge opening.

9. The refuse container of claim 7 including:

a bar extending along one of the plurality of walls adjacent the discharge opening, wherein the plurality of spaced apart protrusions extend from the bar.

10. The refuse container of claim 9 wherein the bar pivots between the first and second positions.

11. The refuse container of claim 7 wherein the plurality of spaced apart protrusions comprise individual cable segments.

12. The refuse container of claim 1 wherein the first guide pivots between the first position and the second position.

13. The refuse container of claim 12 including:

a pivot support extending adjacent the discharge opening, the pivot support including a hollow interior and an elongate slot communicating with the hollow interior, wherein the first refuse discharge guide extends through the elongate slot; and a pivot head coupled to an end of the first guide within the hollow interior to pivotally couple the guide to the refuse container.

14. The refuse container of claim 12 including:

an arcuate pivot shaft supported adjacent the discharge opening, wherein the first refuse discharge guide is slidably coupled to the shaft such that the first guide slides along the shaft to pivot between the first position and the second position.

15. The refuse container of claim 1 wherein the first guide bends between the first position and the second position.

16. The refuse container of claim 15 wherein the first guide rests in a third position parallel to the opening and wherein the first guide is adapted to bend into the first position upon engaging refuse being loaded into the container and is adapted to bend into the second position upon engaging refuse being unloaded from the container.

17. The refuse container of claim 1 wherein the first guide pivots and bends between the first and second positions.

18. The refuse container of claim 1 wherein the first guide is adapted to move to the first position prior to being engaged by refuse.

19. The refuse container of claim 1 wherein the first guide is adapted to move to the second position prior to being engaged by refuse.

20. The refuse container of claim 1 wherein the first guide pivots between the first and second positions and maintains its original shape while pivoting.

21. The refuse container of claim 1, wherein the first and second free ends of the first and second guides are spaced from one another so as not to overlap one another.

22. For use with a refuse container having a plurality of walls defining an interior for containing refuse and a discharge opening for discharging refuse from the container under the force of gravity, an improvement comprising:

a first discharge guide extending from a first perimeter portion of the discharge opening and including at least one first free end; and a second discharge guide extending from a second opposite perimeter portion of the discharge opening and including at least one second free end, wherein each guide is movable between a first position in which its free end extends away from the opening into the interior for loading refuse and a second position in which its free end extends away from the opening underneath and away from the interior for funneling refuse during unloading, whereby its free end is not positioned in the interior during unloading.

23. The improvement of claim 22 wherein the first guide includes:

a plurality of spaced apart protrusions.

24. The improvement of claim 22 wherein the first guide is adapted to move to the first position prior to being engaged by refuse.

25. The improvement of claim 22 wherein the first guide is adapted to move to the second position prior to being engaged by refuse.

26. The improvement of claim 22 wherein the first guide pivots between the first and second positions and maintains its original shape while pivoting.

27. The improvement of claim 22, wherein the first and second free ends of the first and second guides are spaced from one another so as not to overlap one another.

28. A refuse container for use with a refuse collection vehicle having a storage body with a plurality of segregated refuse compartments and a plurality of corresponding adjacent access openings, the refuse container comprising:

a plurality of adjacent bins adapted to correspond to the plurality of adjacent access openings, each bin including:

a plurality of walls defining an interior for containing refuse and a discharge opening for discharging refuse from the container under the force of gravity; and a first discharge guide extending from a first perimeter portion of the discharge opening and including at least one first free end; and a second discharge guide extending from a second opposite perimeter portion of the discharge opening and including at least one second free end, wherein each guide moves between a first position in which the free end extends away from the opening into the interior for loading refuse and a second position in which the free end extends away from the opening underneath and away from the interior for funneling refuse during unloading, whereby the free end is not positioned in the interior during unloading.

29. The refuse container of claim 28 wherein the first guide includes:

a plurality of spaced apart protrusions.

30. The refuse container of claim 28 wherein the first guide is adapted to move to the first position prior to being engaged by refuse.

31. The refuse container of claim 28 wherein the first guide is adapted to move to the second position prior to being engaged by refuse.

32. The refuse container of claim 28 wherein the first guide pivots between the first and second positions and maintains its original shape while pivoting.

33. The refuse container of claim 28, wherein the first and second free ends of the first and second guides are spaced from one another so as not to overlap one another.

34. A refuse container comprising;

a plurality of walls defining an interior for containing refuse and a discharge opening;

a load opening opposite the discharge opening;

a bottom door coupled to at least one of the plurality of walls for selectively opening and closing the discharge opening; and a refuse discharge guide having a free end adjacent the discharge opening, wherein the guide moves between a first position in which the free end extends away from the opening into the interior for loading refuse and a second position in which the free end extends away from the opening underneath and away from the interior for funneling refuse during unloading, whereby the free end is not positioned in the interior during unloading.

35. A refuse container comprising:

a plurality of walls defining an interior for containing refuse and a discharge opening;

a refuse discharge guide having a free end adjacent the discharge opening, wherein the guide pivots between a first position in which the free end extends away from the opening into the interior for loading refuse and a second position in which the free end extends away from the opening underneath and away from the interior for funneling refuse during unloading, whereby the free end is not positioned in the interior during unloading;

a pivot support extending adjacent the discharge opening, the pivot supporting including a hollow interior and an elongate slot communicating with the hollow interior, wherein the refuse discharge guide extends through the elongate slot; and a pivot head coupled to an end of the guide within the hollow interior to pivotally couple the guide to a refuse container.

36. A refuse container comprising:

a plurality of walls defining an interior for containing refuse and a discharge opening;

a refuse discharge guide having a free end adjacent the discharge opening, wherein the guide pivots between a first position in which the free end extends away from the opening into the interior for loading refuse and a second position in which the free end extends away from the opening underneath and away from the interior for funneling refuse during unloading, whereby the free end is not positioned in the interior during unloading; and an arcuate pivot shaft supported adjacent the discharge opening, wherein the refuse discharge guide is slidably coupled to the shaft such that the guide slides along the shaft to pivot between the first position and the second position.

37. A refuse container comprising;

a plurality of walls defining an interior for containing refuse and a discharge opening through which refuse is discharged from the container under the force of gravity;

at least one bottom floor panel fixedly and non-movably coupled to the plurality of walls adjacent the interior and opposite to the discharge opening; and at least one refuse discharge guide having a free end adjacent the discharge opening, wherein the guide is configured to move between a first position in which the free end extends away from the opening into the interior for loading refuse and a second position in which the free end extends away from the opening underneath and away from the interior for funneling refuse during unloading, whereby the free end is not positioned in the interior during unloading.

* * * * *